United States Patent
Hong et al.

(10) Patent No.: US 8,014,900 B2
(45) Date of Patent: Sep. 6, 2011

(54) SYSTEM AND METHOD FOR DETECTING TRAVELING STATE

(75) Inventors: Sun-gi Hong, Hwaseong-si (KR); Jeong-gon Song, Gwangsan-gu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1883 days.

(21) Appl. No.: 11/126,259

(22) Filed: May 11, 2005

(65) Prior Publication Data

US 2005/0278068 A1    Dec. 15, 2005

(30) Foreign Application Priority Data

Jun. 11, 2004   (KR) .................... 10-2004-0042981

(51) Int. Cl.
  G05B 15/00   (2006.01)
  G05B 19/00   (2006.01)
  G01B 3/30    (2006.01)
  G01B 21/00   (2006.01)
  G01B 11/14   (2006.01)
  G01P 21/00   (2006.01)
  G01N 21/00   (2006.01)

(52) U.S. Cl. ............ 700/259; 73/1.79; 356/72; 356/614

(58) Field of Classification Search ................... None
See application file for complete search history.

(56) References Cited

U.S. PATENT DOCUMENTS

| | | | | |
|---|---|---|---|---|
| 4,628,453 A * | 12/1986 | Kamejima et al. | ............. | 701/28 |
| 4,706,120 A * | 11/1987 | Slaughter et al. | ............. | 348/114 |
| 4,789,940 A * | 12/1988 | Christian | ............. | 700/113 |
| 4,887,223 A * | 12/1989 | Christian | ............. | 382/153 |
| 5,051,906 A * | 9/1991 | Evans et al. | ............. | 701/28 |
| 5,081,585 A * | 1/1992 | Kurami et al. | ............. | 701/28 |
| 5,446,356 A * | 8/1995 | Kim | ............. | 318/587 |
| 5,999,866 A * | 12/1999 | Kelly et al. | ............. | 701/28 |
| 6,130,706 A * | 10/2000 | Hart et al. | ............. | 348/148 |
| 6,459,955 B1 * | 10/2002 | Bartsch et al. | ............. | 700/245 |
| 6,496,754 B2 * | 12/2002 | Song et al. | ............. | 700/245 |
| 6,732,826 B2 * | 5/2004 | Song et al. | ............. | 180/169 |
| 6,868,307 B2 * | 3/2005 | Song et al. | ............. | 700/245 |

(Continued)

FOREIGN PATENT DOCUMENTS

JP          6-105781          4/1994

(Continued)

OTHER PUBLICATIONS

WIPS Patent Search indicating U.S. Patent No. 7,161,616 corresponds to Korean Application No. 2000-807654 (PCT/JP 2000/02474).

(Continued)

*Primary Examiner* — John Q Nguyen
*Assistant Examiner* — Nicholas Kiswanto
(74) *Attorney, Agent, or Firm* — Staas & Halsey LLP

(57) ABSTRACT

A system and method for detecting a traveling state. The system includes an image receiving unit acquiring two consecutive images and detecting first traveling information from image information regarding each of the two consecutive images, a traveling information processing unit connected to a driver moving in a direction perpendicular to a direction in which the images are acquired, the traveling information processing unit detecting second traveling information from information regarding the driver, and a control unit determining the traveling state based on the first traveling information and the second traveling information.

8 Claims, 12 Drawing Sheets

U.S. PATENT DOCUMENTS

| | | | |
|---|---|---|---|
| 7,161,616 B1* | 1/2007 | Okamoto et al. | 348/148 |
| 7,162,056 B2* | 1/2007 | Burl et al. | 382/104 |
| 7,171,285 B2* | 1/2007 | Kim et al. | 700/245 |
| 7,245,760 B2* | 7/2007 | Yourlo et al. | 382/153 |
| 7,263,412 B2* | 8/2007 | Gutmann et al. | 700/245 |
| 7,272,467 B2* | 9/2007 | Goncalves et al. | 700/245 |
| 7,480,958 B2* | 1/2009 | Song et al. | 15/319 |
| 2001/0055063 A1* | 12/2001 | Nagai et al. | 348/116 |
| 2003/0109959 A1* | 6/2003 | Tajima et al. | 700/245 |
| 2004/0013295 A1* | 1/2004 | Sabe et al. | 382/153 |
| 2004/0062419 A1* | 4/2004 | Roh et al. | 382/104 |
| 2004/0076324 A1* | 4/2004 | Burl et al. | 382/153 |
| 2004/0193323 A1* | 9/2004 | Higaki et al. | 700/259 |
| 2005/0071046 A1* | 3/2005 | Miyazaki et al. | 700/245 |
| 2005/0102083 A1* | 5/2005 | Xu et al. | 701/70 |
| 2005/0201593 A1* | 9/2005 | Sawada et al. | 382/104 |

FOREIGN PATENT DOCUMENTS

| | | |
|---|---|---|
| JP | 11-066488 | 3/1999 |
| JP | 2003319382 | 11/2003 |
| KR | 10-2001-0112433 | 10/2001 |
| KR | 10-2002-0038819 | 5/2002 |

OTHER PUBLICATIONS

Notice of Allowance dated Aug. 9, 2007 and issued in corresponding Korean Patent Application No. 10-2004-0042981.

* cited by examiner

SYSTEM AND METHOD FOR DETECTING TRAVELING STATE

CROSS-REFERENCE TO RELATED APPLICATION

This application claims priority from Korean Patent Application No. 2004-0042981, filed on Jun. 11, 2004 in the Korean Intellectual Property Office, the disclosure of which is incorporated herein by reference.

BACKGROUND OF THE INVENTION

1. Field of the Invention

The present invention relates to detection of a traveling state, and more particularly, to a method of detecting whether a mobile system capable of making, for example, a rectilinear movement or a rotary movement, is traveling normally.

2. Description of Related Art

With the development of technology in various fields such as electronics, communications, and machines, human life becomes more convenient. An automatic system moving and working instead of people in various fields has been developed and is usually referred to as a robot.

Such a robot detects its position and moves to a particular position. Here, normal traveling is essential to a movement.

For example, when rotating, a robot may slip according to velocities of left and right wheels enabling the robot to drive. In another case, when a robot goes straight ahead, its wheel may be caught and lifted by a doorsill and idle. Such abnormal traveling hinders the robot from moving to a desired position.

To overcome these problems, a method of preventing slippage of a wheel by providing a mechanical structure for the wheel is disclosed in Japanese Patent Publication No. 6-105781. In this case, a structure of the wheel is complicated, and a likelihood of occurrence of mechanical fault is high.

A method of calculating a position of a robot using an image of a surface is disclosed in U.S. Pat. No. 5,999,866. However, a method of detecting a traveling state of a robot is not disclosed.

Accordingly, a method of efficiently detecting a traveling state of a mobile robot and converting an abnormal traveling state into a normal traveling state with a simple structure of a driving unit is desired.

BRIEF SUMMARY

An aspect of the present invention provides a system and method for detecting a traveling state of a mobile robot using image information acquired by a vision sensor and traveling information acquired by a driving unit sensor.

An aspect of the present invention also provides a system and method for converting an abnormal traveling state into a normal traveling state.

According to an aspect of the present invention, there is provided a system for detecting a traveling state. The system includes an image receiving unit acquiring two consecutive images and detecting first traveling information from image information regarding each of the two consecutive images, a traveling information processing unit connected to a driver moving in a direction perpendicular to a direction in which the images are acquired and detecting second traveling information from the driver, and a control unit determining the traveling state based on the first traveling information and the second traveling information.

According to another aspect of the present invention, there is provided a method of detecting a traveling state. The method comprises acquiring two consecutive images and detecting first traveling information from image information regarding each of the two consecutive images, detecting second traveling information from a driver moving in a direction perpendicular to a direction in which the images are acquired, and determining the traveling state based on the first traveling information and the second traveling information.

According to another aspect of the present invention, there is provided a system for detecting a traveling state, including: a control unit including a command receiver receiving a traveling command from a user, a traveling state determiner receiving traveling information and image information and determining a current traveling state of the system, and a compensator correcting, when a current traveling state is abnormal, the abnormal traveling state into a normal state; a traveling unit including a driver receiving a traveling command and driving the system to move, and a traveling information processor performing signal processing on traveling information received from the driver and transmitting a signal processing result to the control unit; an image receiving unit including an image grabber receiving an image according to a command from the control unit and an image information processor performing signal processing on image information received from the image grabber and transmitting a signal processing result to the control unit; and a traveling command input unit receiving a traveling command and transmitting the traveling command to the control unit.

According to another aspect of the present invention, there is provided a method of determining a rotary movement state, including: receiving a first image and a second image; converting the first image and the second image into respective first and second polar coordinates; acquiring a first polar image and a second polar image from the first polar coordinates and the second polar coordinates, respectively; and detecting a rotation angle by setting a parameter shift_count to adjust the number of sum of squared distance (SSD) calculations which are calculated with respect to 360 angles each at an interval of 1 degree from 0 degrees to 359 degrees.

According to another aspect of the present invention, there is provided a method of determining a rectilinear movement state, including: receiving two consecutive images from an image grabber; calculating a normalized difference between the two consecutive images by calculating a value indicating a normalized image using a difference between the two consecutive images; and determining whether the normalized difference exceeds a threshold value and, when the normalized difference exceeds a the threshold value, setting a parameter variable to "TRUE" indicating rectilinear movement, and when the normalized difference does not exceed the threshold value, setting the parameter variable to "FALSE" indicating no rectilinear movement.

According to another aspect of the present invention, there is provided a method of processing traveling information, including: setting a coordinate value (x,y) and an azimuth angle (q)(Θ) of a current position of a robot on an X-Y plane; calculating an amount of a rectilinear movement of a traveling unit of the system and the amount of a rotary movement of the traveling unit; and updating the position and the azimuth of the system based on the set position and the set azimuth angle and the amount of calculated rectilinear movement and the amount of calculated rotary movement.

According to another aspect of the present invention, there are provided computer-readable storage media encoded with processing instructions for causing a processor to perform methods of the present invention.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF THE PREFERRED EMBODIMENTS

Figure 1:
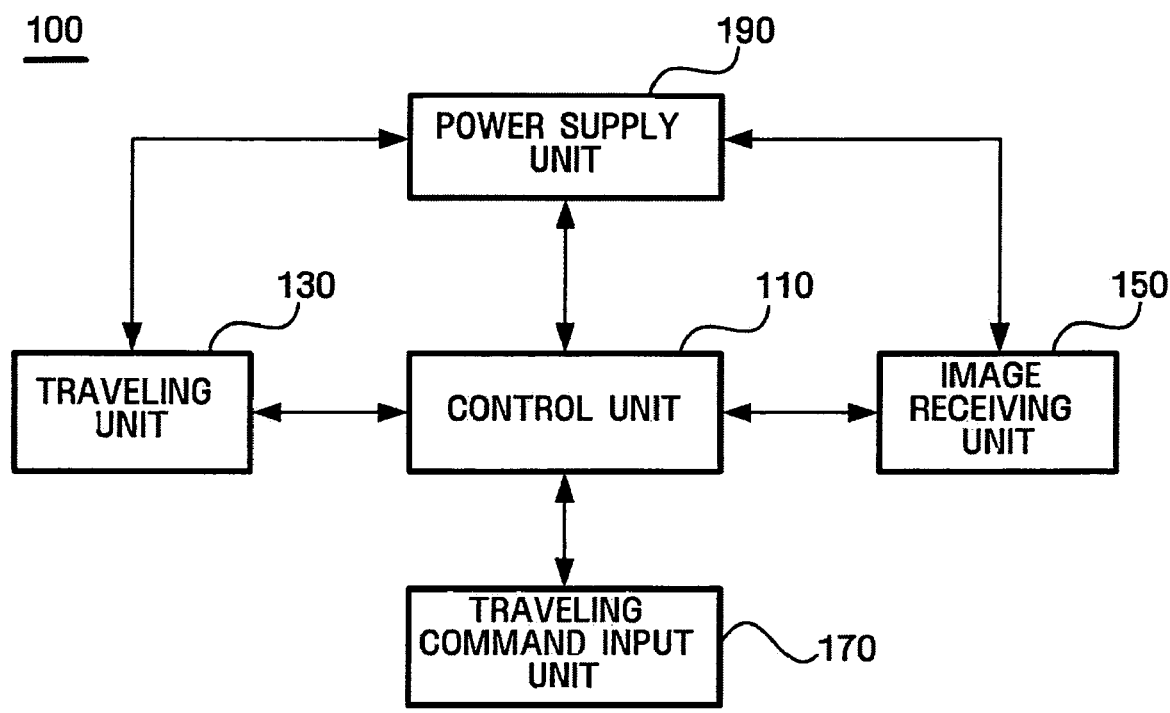
FIG. 1 is a schematic block diagram of a system for detecting a traveling state according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

The present invention is described hereinafter with reference to flowchart illustrations of methods according to embodiments of the invention. It is to be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to perform a series of operations on the computer or other programmable apparatus to produce a computer implemented process such that the instructions executed on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s).

It is also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 is a schematic block diagram of a system 100 for detecting a traveling state according to an embodiment of the present invention. The system 100 includes a control unit 110, a traveling unit 130, an image receiving unit 150, a traveling command input unit 170, and a power supply unit 190.

The traveling command input unit 170 receives a traveling command such as a rectilinear movement or a rotary movement from a user and transmits the traveling command to the control unit 110. As used in this description, a user means any type of automated medium which can make a traveling command or a human being. The traveling command input unit 170 may be a traveling function button provided on the system to directly receive a traveling command from a user. Alternatively, the traveling command input unit 170 may be a wireless signal receiving module capable of receiving a wireless control signal to receive a traveling command from a remote user. In addition, the traveling command input unit 170 receives a command to stop the system 100 from traveling from the user and transmits the command to the control unit 110.

The image receiving unit 150 includes an image receiver such as a camera and transmits image information to the control unit 110.

The traveling unit 130 may be a wheel type that moves by rotating a plurality of wheels using a servo motor or a stepping motor. The traveling unit 130 detects a moving distance and a moving direction and transmits them to the control unit 110. Alternatively, the traveling unit 130 may be implemented in other various types such as a caterpillar type using a tread and a joint type using a plurality of legs.

The control unit 110 includes a microprocessor and a memory. The control unit 110 receives a traveling command from the traveling command input unit 170, operates the traveling unit 130 and the image receiving unit 150 according to the received traveling command, and detects a traveling state of the system 100. In addition, when the amount of electric power stored in the power supply unit 190 is decreased below a predetermined level, the control unit 110 controls the electric power to be charged in the power supply unit 190. In other words, the control unit 110 controls an entire operation of the system 100.

The power supply unit 190 supplies electric power needed to operate the system 100, for example, electric power for a motor rotating the wheels of the traveling unit 130, electric power needed to operate the image receiving unit 150, electric power needed to operate the control unit 110, etc. The power supply unit 190 may be implemented by a storage battery to operate the system 100 without external power supply for a predetermined period of time.

Figure 2:
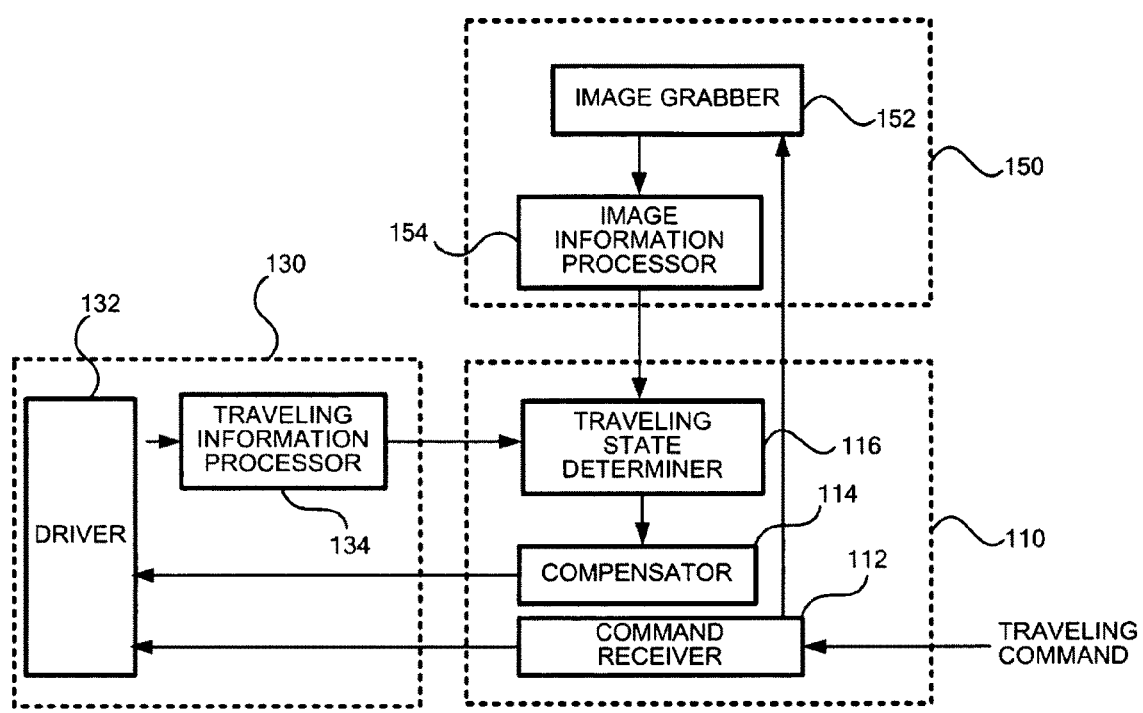
FIG. 2 is a detailed block diagram of the system for detecting a traveling state shown in FIG. 1.

FIG. 2 is a detailed block diagram of the system 100 for detecting a traveling state shown in FIG. 1.

The traveling unit 130 includes a driver 132 that receives a traveling command from the control unit 110 and drives the system 100 to move, and a traveling information processor 134 that performs signal processing on traveling information received from the driver 132 and transmits a signal processing result to the control unit 110. The driver may include a wheel and a motor that rotates the wheel.

The image receiving unit 150 includes an image grabber 152 that receives an image according to a command from the control unit 110, and an image information processor 154 that performs signal processing on image information received from the image grabber 152 and transmits a signal processing result to the control unit 110. The image grabber 152 includes an image receiver such as a camera. A lens included in the image receiver may be made to face a direction perpendicular to a plane on which the system 100 moves.

The control unit 110 includes a command receiver 112, a traveling state determiner 116, and a compensator 114.

The command receiver 112 receives a traveling command from a user and operates the driver 132 and the image grabber 152.

The traveling state determiner 116 receives traveling information and image information respectively from the traveling information processor 134 and the image information processor 154 and determines a current traveling state of the system 100. When the current traveling state is not normal, for example, when the wheel of the driver 132 rotates idles or slips, the compensator 114 corrects an abnormal traveling state of the system 100 into a normal state. The operation and the effect of the system 100 having the above-described structure will be described.

Upon receiving a traveling command via a traveling function button provided on the system 100, a wireless signal receiving module, or a self-calculation of command, the command receiver 112 operates the motor included in the driver 132 and the image grabber 152. The traveling command may be either of a rectilinear movement command and a rotary movement command. A case of executing the rectilinear movement command will be described first.

The command receiver 112 operates the image receiver included in the image grabber 152. Then, the image receiver receives an image at predetermined time intervals and transmits the received image to the image information processor 154. Here, the lens included in the image receiver may be made to face a direction perpendicular to a plane on which the system 100 moves. For example, when the system 100 is a household cleaning robot, the received image may be an image of a ceiling of a house. The image information processor 154 receives the image from the image grabber 152, calculates a reference value for determining on a rectilinear movement using the received image, and transmits the reference value to the traveling state determiner 116.

Meanwhile, the command receiver 112 operates the motor of the driver 132 to make the system 100 move rectilinearly. The traveling information processor 134 connected with the motor of the driver 132 measures a rotational displacement of the motor at a predetermined period and calculates a moving distance of the wheel using the measured rotational displacement. Thereafter, the traveling information processor 134 transmits calculated distance information to the traveling state determiner 116. For clarity of the description, hereinafter, the distance information is referred to as "integrated distance information".

The traveling state determiner 116 receives the reference value for determining on the rectilinear movement and the integrated distance information and determines a rectilinear movement state, for example, determines whether the wheel of the driver 132 rotates idle. When the reference value indicates a non-rectilinear movement and when the integrated distance information exceeds a predetermined threshold value, it may be determined that a current rectilinear movement is abnormal like the wheel rotates idle. When the traveling state determiner 116 determines a current movement as an abnormal rectilinear movement, it provokes the compensator 114 to control the driver 132 since it is necessary to control the driver 132 to realize normal traveling. The traveling state determiner 116 provides information for traveling compensation to the compensator 114.

In a case of executing the rotary movement command, the apparatus according to the present invention operates as follows.

The command receiver 112 operates the image receiver included in the image grabber 152. Then, the image receiver receives an image at an instant when the rotary movement command is received and an image at an instant when a traveling stop command, i.e., a command to stop a rotary movement, is received. The image information processor 154 receives the two images from the image grabber 152, calculates an image rotation angle for a predetermined period of time using the two images, and transmits calculated angle information to the traveling state determiner 116. For clarity of the description, hereinafter, the angle information is referred to as "first rotation information".

Meanwhile, the command receiver 112 operates the driver 132 so that the system 100 makes a rotary movement. The traveling information processor 134 connected with the driver 132 measures a rotational displacement of the motor of the driver 132 from the beginning to the end of the rotary movement, calculates a rotation angle using the rotational displacement, and transmits the calculated rotation angle to the traveling state determiner 116. For clarity of the description, hereinafter, information on the calculated rotation angle is referred to as "second rotation information."

The traveling state determiner 116 receives and compares the first rotation information and the second rotation information and determines a rotary movement state, for example, determines whether the wheel of the driver 132 has slipped. When a difference between the first rotation information and the second rotation information exceeds a predetermined value, it may be determined that an abnormal rotary movement like slippage of the wheel has been made. When the traveling state determiner 116 determines a current movement as an abnormal rotary movement, current position coordinates of system 100 need to be changed for normal traveling. Accordingly, the traveling state determiner 116 makes the compensator 114 to update the current position coordinates of the system 100. In this case, the traveling state determiner 116 provides information for traveling compensation to the compensator 114. The traveling information processor 134 or the image information processor 154 may be included in the control unit 110.

Figure 3:
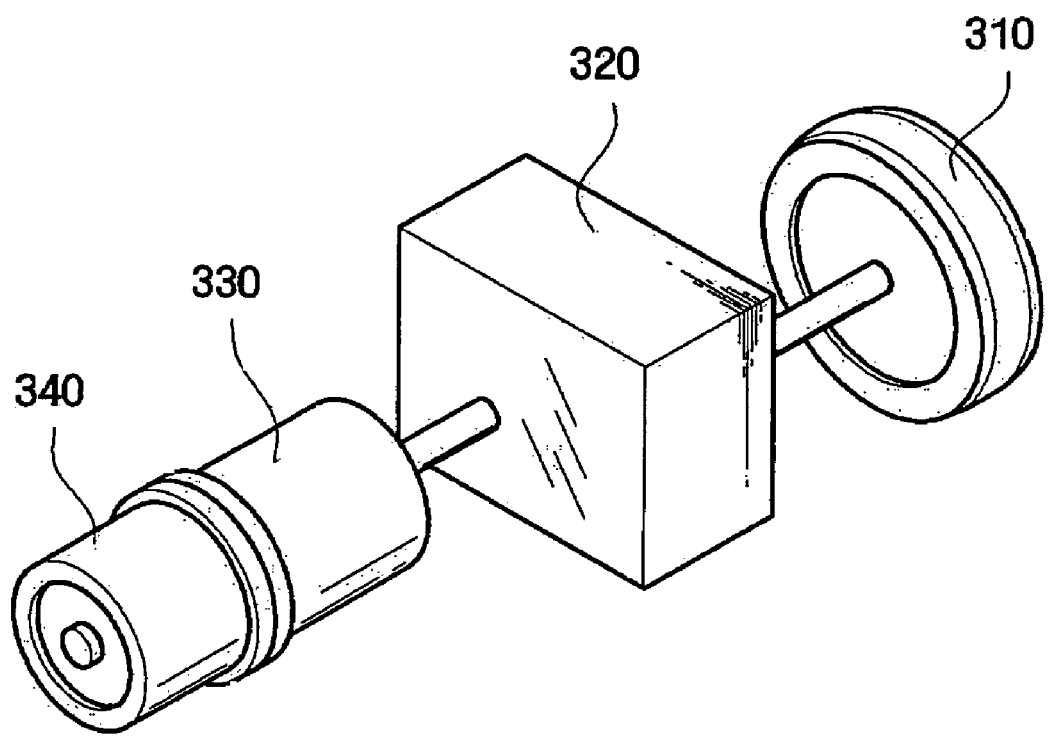
FIG. 3 is a schematic perspective view of a traveling unit according to an embodiment of the present invention.

FIG. 3 is a schematic perspective view of a traveling unit according to an embodiment of the present invention.

The traveling unit (130 shown in FIGS. 1 and 2) includes a wheel 310, a motor 330 driving the wheel 310, a gear box 320 transmitting motive power between the motor 330 and the wheel 310, and an encoder 340 connected to the motor 330 to process information on a moving distance or a rotation angle of the wheel 310. The wheel 310, the gear box 320, and the motor 330 correspond to the driver 132 shown in FIG. 2. The encoder 340 corresponds to the traveling information processor 134 shown in FIG. 2.

Figure 4:
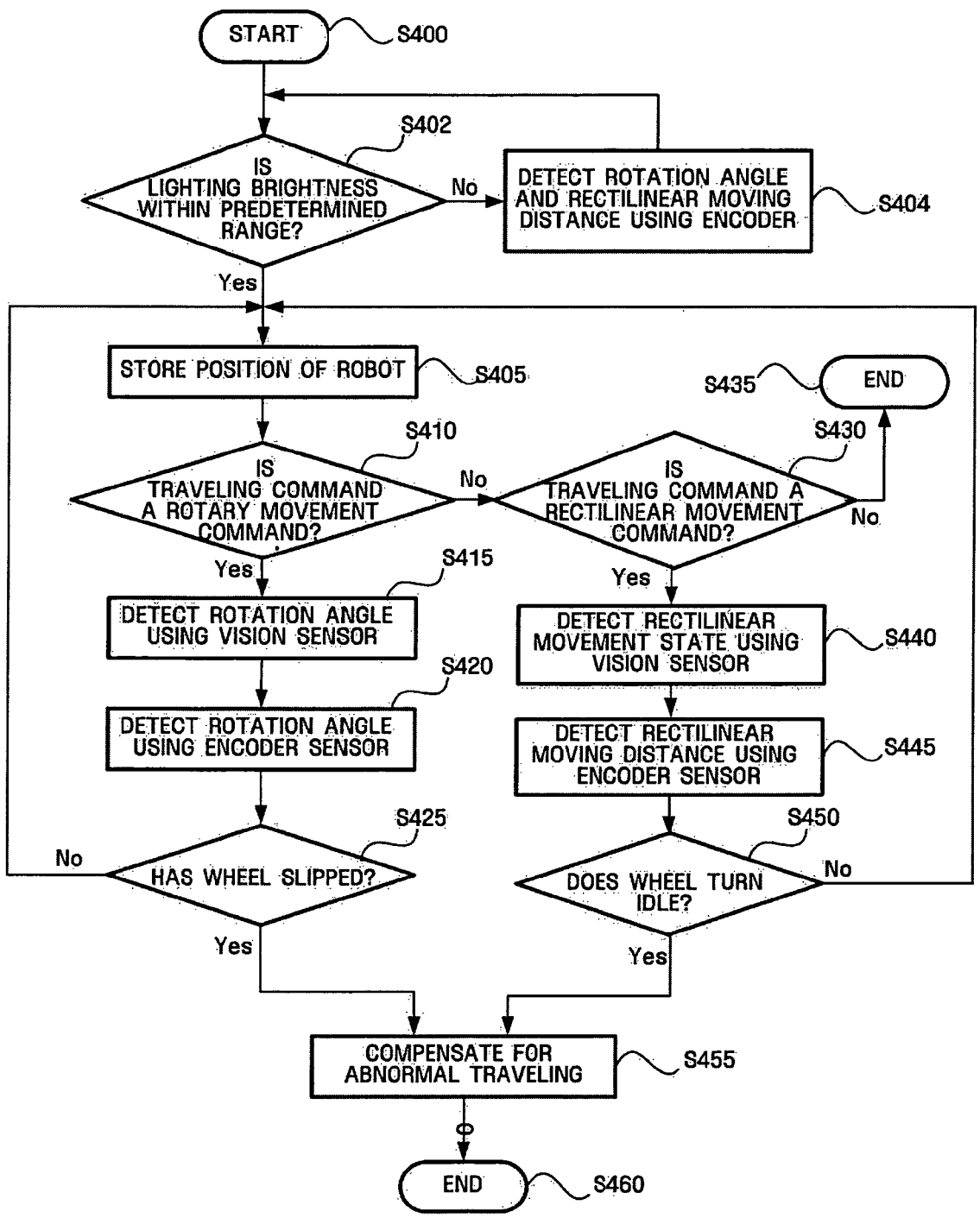
FIG. 4 is a flowchart of a method of detecting a traveling state according to an embodiment of the present invention.

FIG. 4 is a flowchart of a method of detecting a traveling state according to an embodiment of the present invention. This method can be performed by the system of FIGS. 1-3 and is, for ease of explanation only, described in conjunction with those figures. However, it is to be understood that other systems may perform the method.

Referring to FIGS. 1-4, if a user inputs a traveling command to the system 100 in operation S400, the system 100 determines whether current lighting brightness is within a predetermined range in operation S402 in order not to perform the traveling detection when it is too bright or dark for an image receiver of the image grabber 152 to receive a normal image.

To perform operation S402, a sensor sensing lighting brightness may be attached to the system 100 and may transmit a sensing result to the command receiver 112. When the current lighting brightness is not within the predetermined range, the command receiver 112 operates only the driver 132 without driving the image grabber 152 so that a traveling state is detected using only the driver 132 in operation S404. Thereafter, when the lighting brightness comes into the predetermined range, the command receiver 112 operates the image grabber 152.

When the lighting brightness is within the predetermined range, if the system 100 is, for example, a household robot, information on a current position of the robot is stored in operation S405. The current position of the robot may be expressed by a vector indicating a position of the robot with respect to a particular position, i.e., the origin, in space. Alternatively, the current position of the robot may be set as the origin. Components of the vector may include a distance and an azimuth angle.

The traveling command may be a rotary movement command, a rectilinear movement command, or a traveling stop command. When the traveling command is the traveling stop command, the robot stops in operation S435.

When the traveling command is the rotary movement command in operation S410, the first rotation information is detected using a vision sensor of the image receiver included in the image receiving unit 150 in operation S415, and second rotation information is detected using an encoder sensor included in the traveling unit 130 in operation S420. The first rotation information is referred to as a "vision_angle" and the second rotation information is referred to as an "odometry_angle."

A method of detecting the vision_angle will be described in detail with reference to FIGS. 7, 8, and 9. A method of detecting the odometry_angle will be described in detail with reference to FIG. 11.

In operation S425, it is determined whether a wheel has slipped based on comparison between the vision_angle and the odometry_angle. For example, when a value of the vision_angle is greater than a value of the odometry_angle by more than a threshold value, i.e., when vision_angle>odometry_angle+threshold value, it is determined that the wheel has slipped. When it is determined that the wheel has slipped, an abnormal traveling state is detected and compensation for the abnormal traveling state is performed in operation S455. A method of compensating for the abnormal traveling state will be described in detail with reference to FIG. 12. When it is determined that the wheel has not slipped, the method returns to operation S405.

Meanwhile, when the traveling command is the rectilinear movement command determined in operation S430, a rectilinear movement state is detected using the vision sensor included in the image receiving unit 150 in operation S440, and integrated distance information is detected using the encoder sensor included in the traveling unit 130 in operation S445.

A method of detecting the rectilinear movement state will be described in detail with reference to FIG. 10 and a method of detecting the integrated distance information will be described in detail with reference to FIG. 11.

In operation S450, it is determined whether the wheel turns idle using the rectilinear movement state and the integrated distance information. For example, when a non-rectilinear movement is detected and when a value of the integrated distance information exceeds a threshold value, it is determined that the wheel turns idle.

When it is determined that the wheel turns idle, an abnormal traveling state is detected and compensation for the abnormal traveling state is performed in operation S455. A method of compensating for the abnormal traveling state will later be described in detail with reference to FIG. 12. When it is determined that the wheel performs a rectilinear movement normally, the method returns to operation S405.

Figure 5:
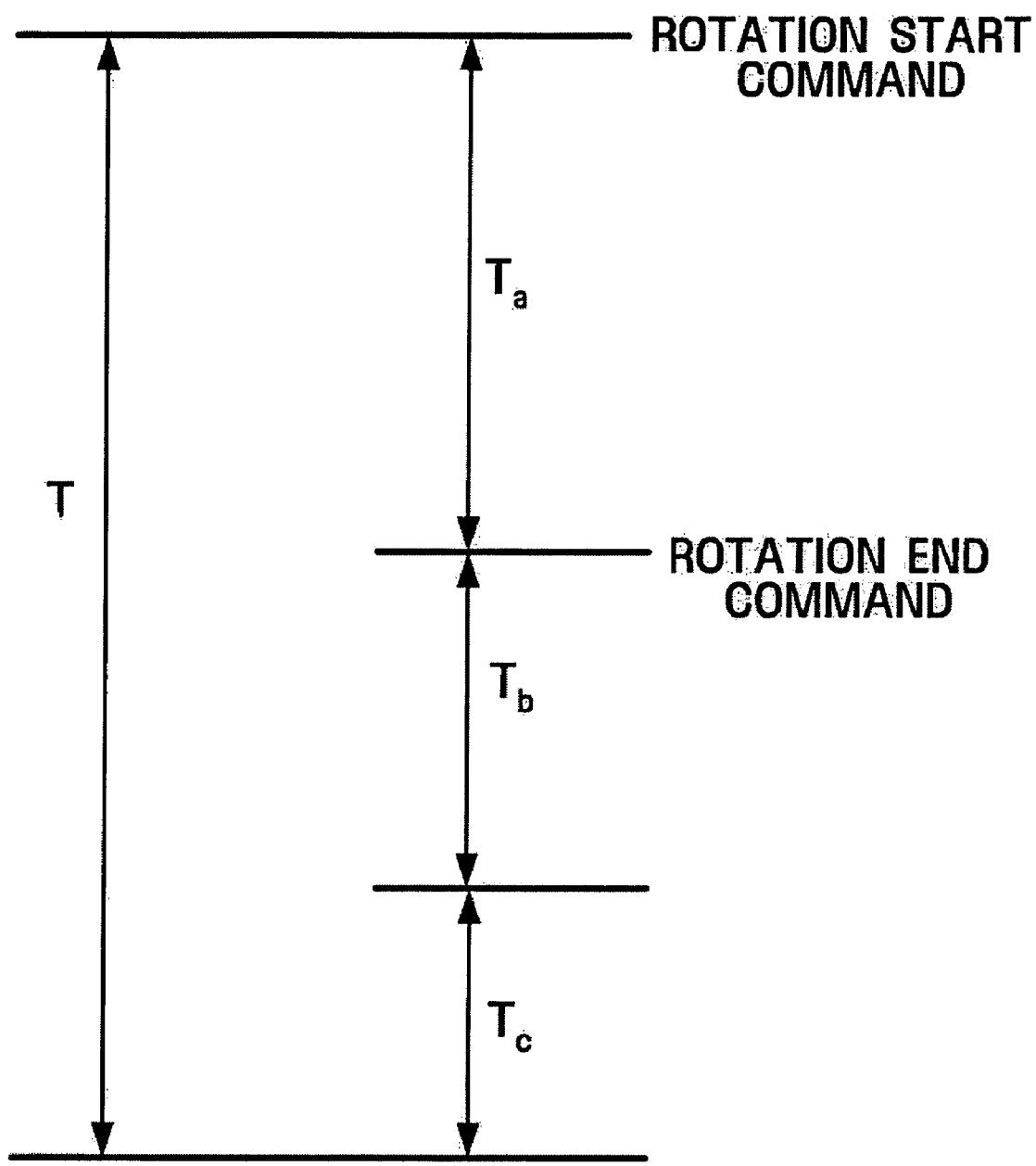
FIG. 5 illustrates a time flow when a traveling state is detected based on a rotary movement in an embodiment of the present invention.

FIG. 5 illustrates a time flow when a traveling state is detected based on a rotary movement according to an embodiment of the present invention.

Referring to FIGS. 2 and 5, the image grabber 152 receives an image at the start of a rotary movement and an image at the end of the rotary movement. In FIG. 5, duration of the rotary movement is denoted by $T_a$. Thereafter, time taken to determine whether a wheel has slipped is denoted by $T_b$. Time taken to compensate for an abnormal traveling state when it is determined that the wheel has slipped is denoted by $T_c$. Accordingly, time T taken to detect the traveling state based on the rotary movement and compensate for the abnormal traveling state is expressed by Equation (1).

$$T=T_a+T_b+T_c \quad (1)$$

Figure 6:
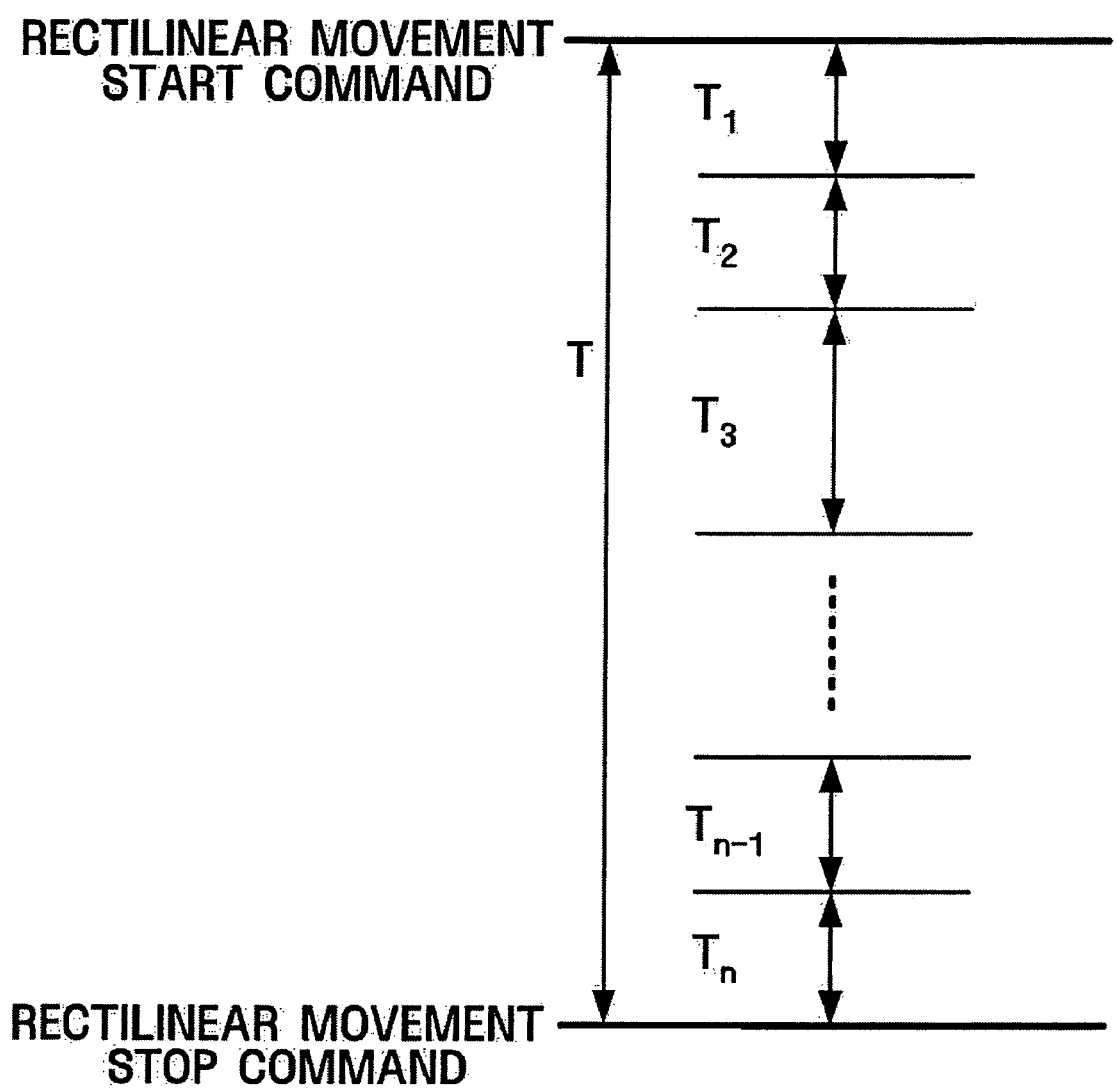
FIG. 6 illustrates a time flow when a traveling state is detected based on a rectilinear movement in an embodiment of the present invention.

FIG. 6 illustrates a time flow when a traveling state is detected based on a rectilinear movement in an embodiment of the present invention.

Referring to FIGS. 2 and 6, the image receiving unit 150 compares two consecutive images received at predetermined time intervals starting from the beginning of the rectilinear movement and detects a rectilinear traveling state. Next, the traveling unit 130 detects integrated distance information. Thereafter, the control unit 110 determines whether the rectilinear traveling state is normal, for example, whether a wheel turns idle. When it is determined that the rectilinear traveling state is abnormal, the abnormal rectilinear traveling state is compensated for. Time taken to perform the above-described operations is denoted by $T_1$.

Referring to FIG. 6, time between receipt of a rectilinear movement start command and receipt of a rectilinear movement stop command is denoted by T, and an operation of detecting the rectilinear traveling state is performed "n" times during the time T. In other words, a relationship shown in Equation (2) can be established.

$$T=T_1+T_2+T_3+\ldots+T_{n-1}+T_n \quad (2)$$

Here, since traveling compensation may be performed or not, $T_k$ ($1 \leq k \leq n$) may not be the same.

Figure 7:
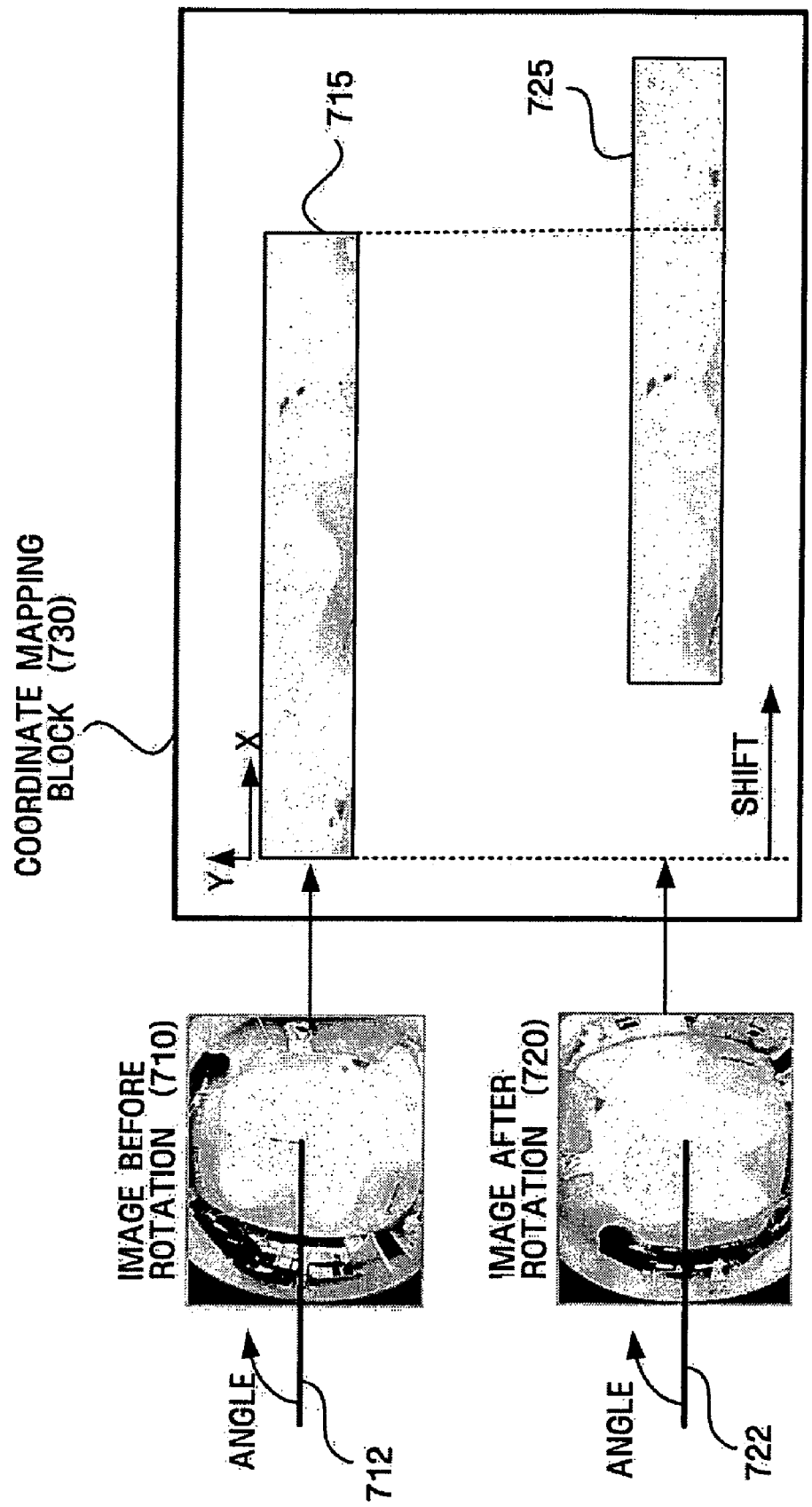
FIG. 7 illustrates an image coordinate mapping method for obtaining a rotation angle using an image receiver according to an embodiment of the present invention.

FIG. 7 illustrates an image coordinate mapping method for obtaining a rotation angle using an image receiver according to an embodiment of the present invention. This method can be performed by the system of FIGS. 1-3 and is, for ease of explanation only, described in conjunction with those figures. However, it is to be understood that other systems may perform the method.

Referring to FIGS. 1-3 and 7, when the system 100 shown in FIG. 1 receives a rotary movement command from the user through the traveling command input unit 170, an image receiver included in the image grabber 152 shown in FIG. 2 transmits an image 710 at an instant when the rotary movement command is received and an image 720 at an instant when a rotary movement ends in response to a traveling stop command from the user to the image information processor 154. The image information processor 154 includes a coordinate mapping block 730. The coordinate mapping block 730 obtains polar coordinate images (hereinafter, referred to as a "first polar coordinate image" and a "second polar coordinate image", respectively) 715 and 725 in which the X-axis indicates an angle and the Y-axis indicates a distance with respect to the images 710 and 720, respectively. The origins of the respective first and second polar coordinate images 715 and 725 may be respectively set on the bases of reference lines 712 and 722 of the respective images 710 and 720. The reference lines 712 and 722 may be randomly set to have the optical centers of the images 710 and 720 as their ends, respectively. The image 720 at the end of the rotary movement has a time delay of $T_a$ shown in FIG. 5 with respect to the image 710 at the receipt of the rotary movement command.

Figure 8:
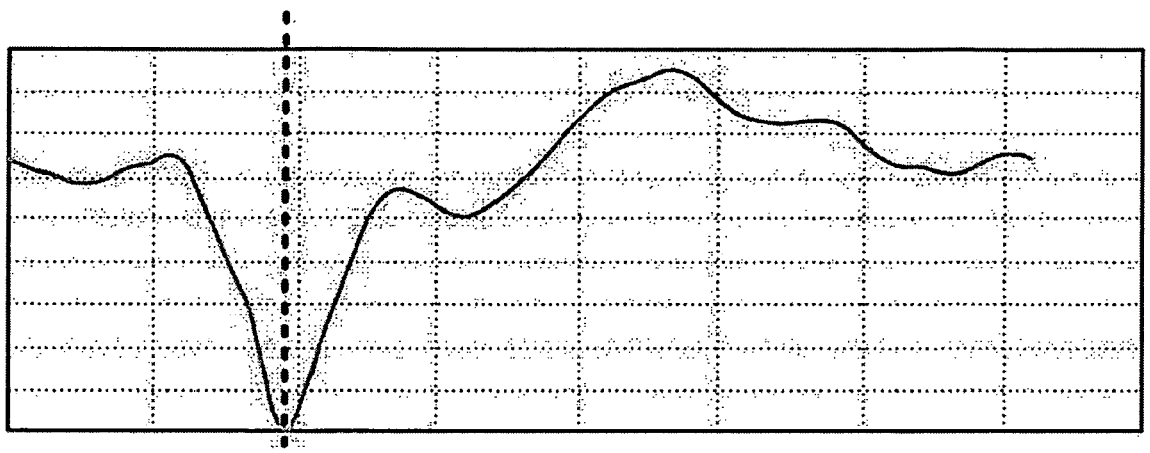
FIG. 8 is a graph used to obtain a rotation angle using an image receiver in an embodiment of the present invention.

FIG. 8 is a graph used to obtain a rotation angle using an image receiver in an embodiment of the present invention.

In FIG. 7, the second polar coordinate image 725 is shifted by a predetermined angle in a positive direction of the X-axis and is compared with the first polar coordinate image 715. For example, when the X-axis ranges from 0 degrees to 360 degrees, the second polar coordinate image 725 is shifted to the right by 1 degree, and then the shifted polar coordinate image 725 is compared with the first polar coordinate image 715. Since the X-axis of the second polar coordinate image 725 indicates an angle, a part of the second polar coordinate image 725 shifted beyond the 360 degrees on the X-axis returns to the 0 degrees on the X-axis.

Before the shift and always when the second polar coordinate image 725 is shifted by 1 degree in the positive direction of the X-axis, that is, with respect to each of 360 angles (i.e., 0 to 359 degrees with an interval of 1 degree), a difference value between information on the first polar coordinate image 715 and information on the second polar coordinate image 725 (hereinafter, referred to as a "image information difference value") is obtained. In this case, 360 image information difference values are obtained. Hereinafter, a value obtained by summing up the individual image information difference values squared is referred to as a sum of squared distance (SSD).

In FIG. 8, an X-axis indicates an angle by which the second polar coordinate image 725 is shifted, and a Y-axis indicates the SSD obtained whenever the second polar coordinate image 725 is shifted. The rotation angle can be represented by an angle on the X-axis corresponding to a least SSD at which the first polar coordinate image 715 overlaps the second polar coordinate image 725.

Figure 9:
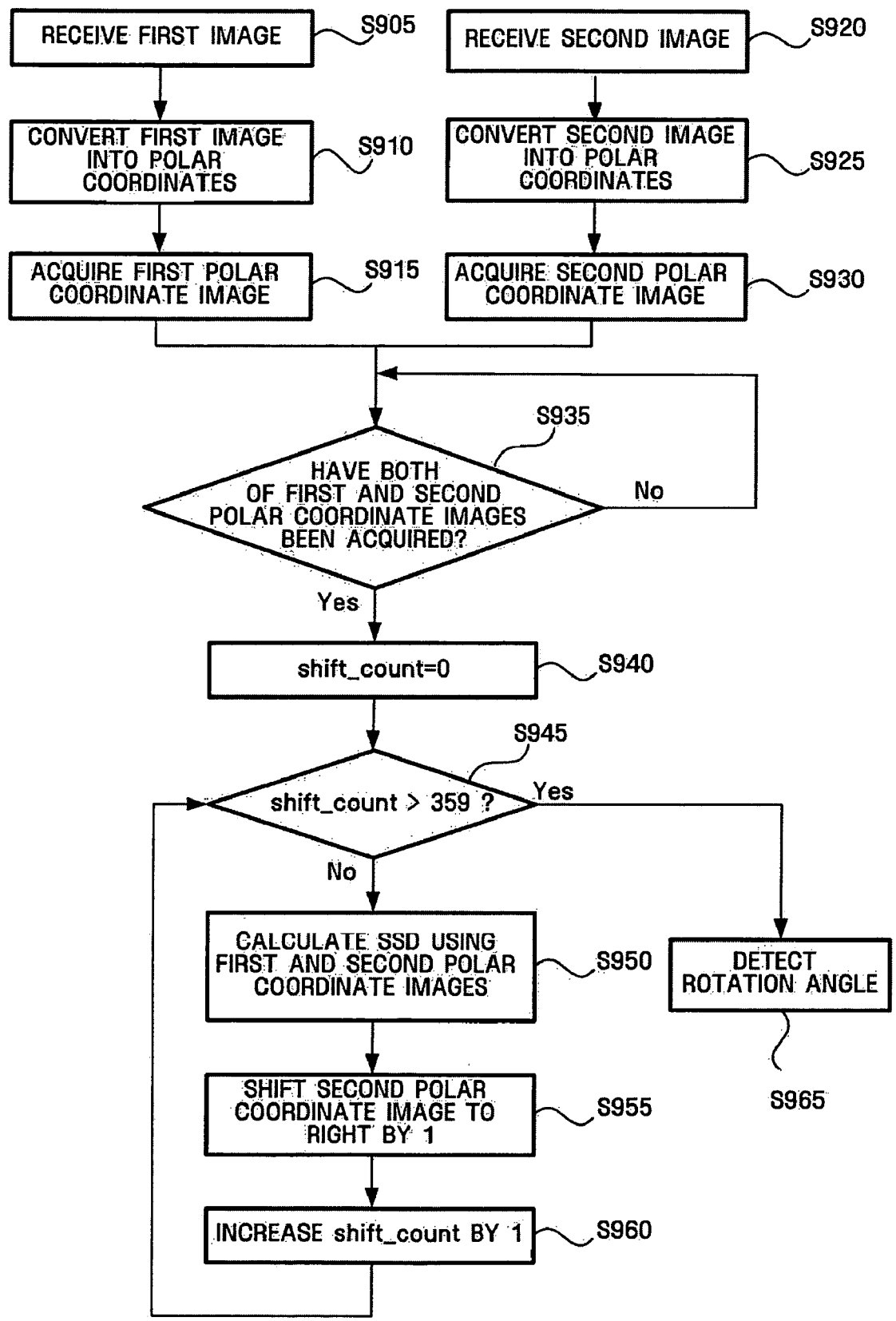
FIG. 9 is a flowchart of a method of determining a state of a rotary movement using an image receiving unit according to an embodiment of the present invention.

FIG. 9 is a flowchart of a method of determining a rotary movement state using an image receiving unit according to an embodiment of the present invention. Operations shown in FIG. 9 are performed by the image grabber 152 and the image information processor 154 shown in FIG. 2.

The image receiver included in the image grabber 152 shown in FIG. 2 receives an image at the start of a rotary movement in operation S905. The image information processor 154 converts the received image into polar coordinates, as shown in FIG. 7, in operation S910, thereby acquiring the first polar coordinate image 715 in operation S915. Thereafter, the image receiver receives an image at the end of the rotary movement in operation S920. The image information processor 154 converts the received image into polar coordinates, as shown in FIG. 7, in operation S925, thereby acquiring the second polar coordinate image 725 in operation S930.

Since a time delay occurs after the first polar coordinate image 715 is acquired until the second polar coordinate image 725 is acquired, other operations are not performed until both of the first and second polar coordinate images 715 and 725 are acquired in operation S935.

After both of the first and second polar coordinate images 715 and 725 are acquired, a procedure for detecting a rotation angle is performed. In the procedure, a parameter shift_count is set to adjust the number of SSD calculations. In the embodiment of the present invention, SSDs are calculated with respect to 360 angles from 0 degrees to 359 degrees at an interval of 1 degree. Accordingly, the parameter shift_count is initially set to 0 in operation S940. When the parameter shift_count becomes 360 in operation S945, the rotation angle is detected in operation S965.

Until the parameter shift_count becomes 360, an SSD is calculated using the first and second polar coordinate images 715 and 725 according to the method illustrated in FIG. 8 in operation S950, then the second polar coordinate image 725 is shifted by 1 degree in the positive direction of the X-axis as shown in FIG. 7 in operation S955, and then the parameter shift_count is increased by 1 in operation S960.

In detecting the rotation angle when the parameter shift_count becomes 360, as described with respect to FIG. 8, an angle corresponding to a least SSD may be detected as the rotation angle.

When the rotation angle is detected by the image information processor 154 in operation S965, the rotation angle is transmitted to the traveling state determiner 116 included in the control unit 110. The rotation angle corresponds to the first rotation information described above with reference to FIG. 2

In the above-described embodiment of the present invention, the second polar coordinate image 725 is shifted by 1 degree in the positive direction of the X-axis to detect the rotation angle. However, in other embodiments of the present invention, the first polar coordinate image 715 may be shifted instead of the second polar coordinate image 725, or the second polar coordinate image 725 may be shifted in a negative direction of the X-axis instead of the positive direction.

Figure 10:
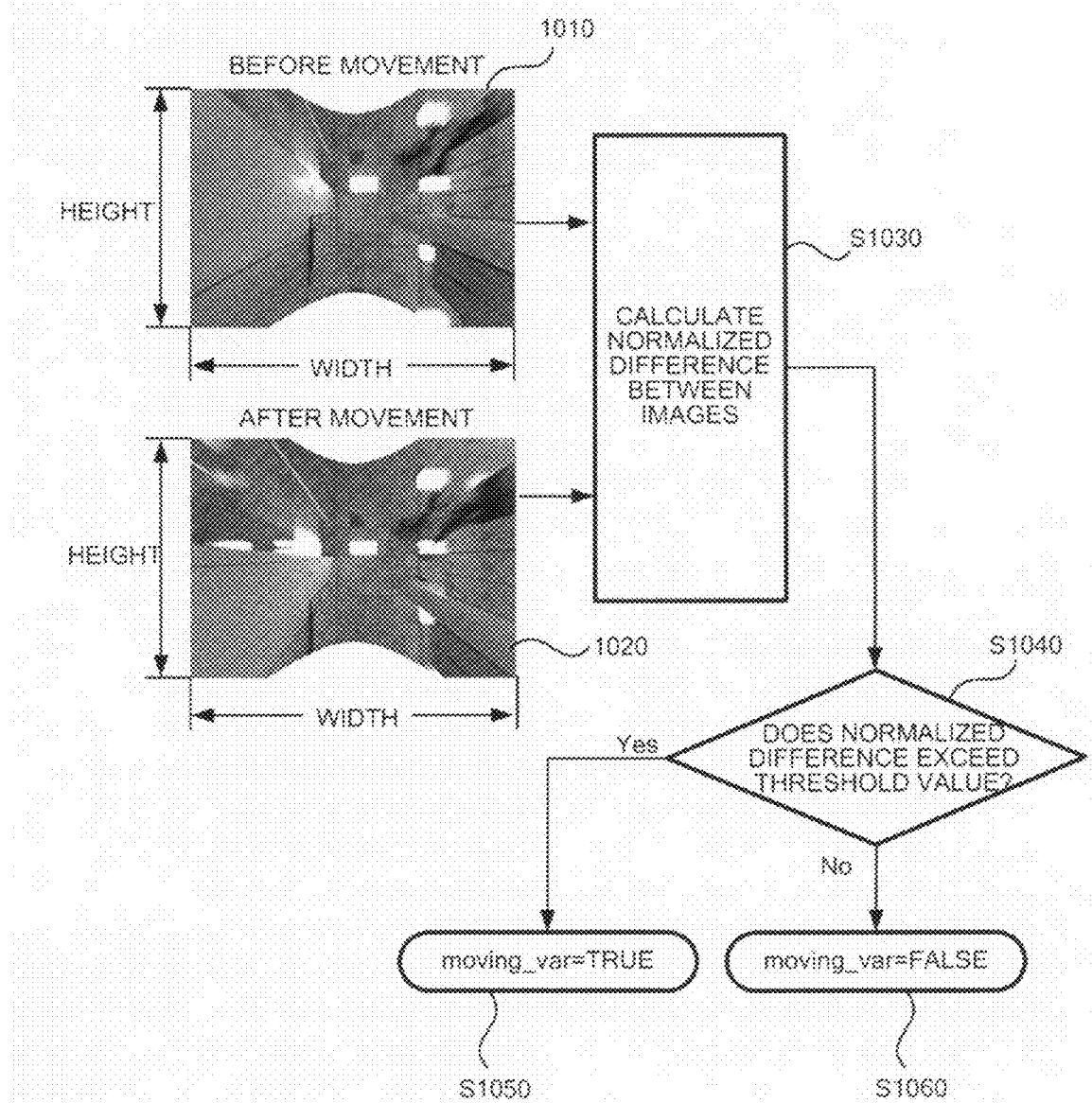
FIG. 10 illustrates a method of determining a state of a rectilinear movement using an image receiving unit according to an embodiment of the present invention.

FIG. 10 illustrates a method of determining a rectilinear movement state using an image receiving unit according to an embodiment of the present invention. This method can be performed by the system of FIGS. 1-3 and is, for ease of explanation only, described in conjunction with those figures. However, it is to be understood that other systems may perform the method.

Referring to FIGS. 1-3 and 10, when the system 100 shown in FIG. 1 receives a rectilinear movement command from a user through the traveling command input unit 170, the image receiver included in the image grabber 152 shown in FIG. 2 receives images at an interval of a predetermined period of time. The image information processor 154 receives two consecutive images 1010 and 1020 from the image grabber 152 in operation S1030.

In operation S1030, a value indicating a normalized image is also obtained using a difference between the two consecutive images 1010 and 1020. The value is represented by "N" and is used as a reference for determining the rectilinear movement state. The value N can be obtained as shown in Equation (3).

$$N = \frac{1}{X \times Y} \sum_{x=1}^{X} \sum_{y=1}^{Y} |A(x, y) - B(x, y)| \qquad (3)$$

Here, X denotes a width of the images 1010 and 1020, Y denotes a height of the images 1010 and 1020, A(x,y) denotes an image information value at a coordinate point (x,y) on the image 1010 before the movement, and B(x,y) denotes an image information value at a coordinate point (x,y) on the image 1020 after the movement.

When the system 100 moves according to the rectilinear movement command, the value N is particularly defined by Equation (3). In this case, a parameter moving_var indicating whether the system 100 moves rectilinearly is defined. Next, at operation S1040, it is determined whether the normalized difference between the images calculated in operation S1030 exceeds a threshold value. When the value N exceeds a predetermined threshold value, the parameter moving_var is set to "TRUE" indicating that the system 100 is moving rectilinearly in operation S1050. However, when the value N does not exceed the predetermined threshold value, the parameter moving_var is set to "FALSE" indicating that the system 100 is not moving rectilinearly in operation S1060.

Figure 11:
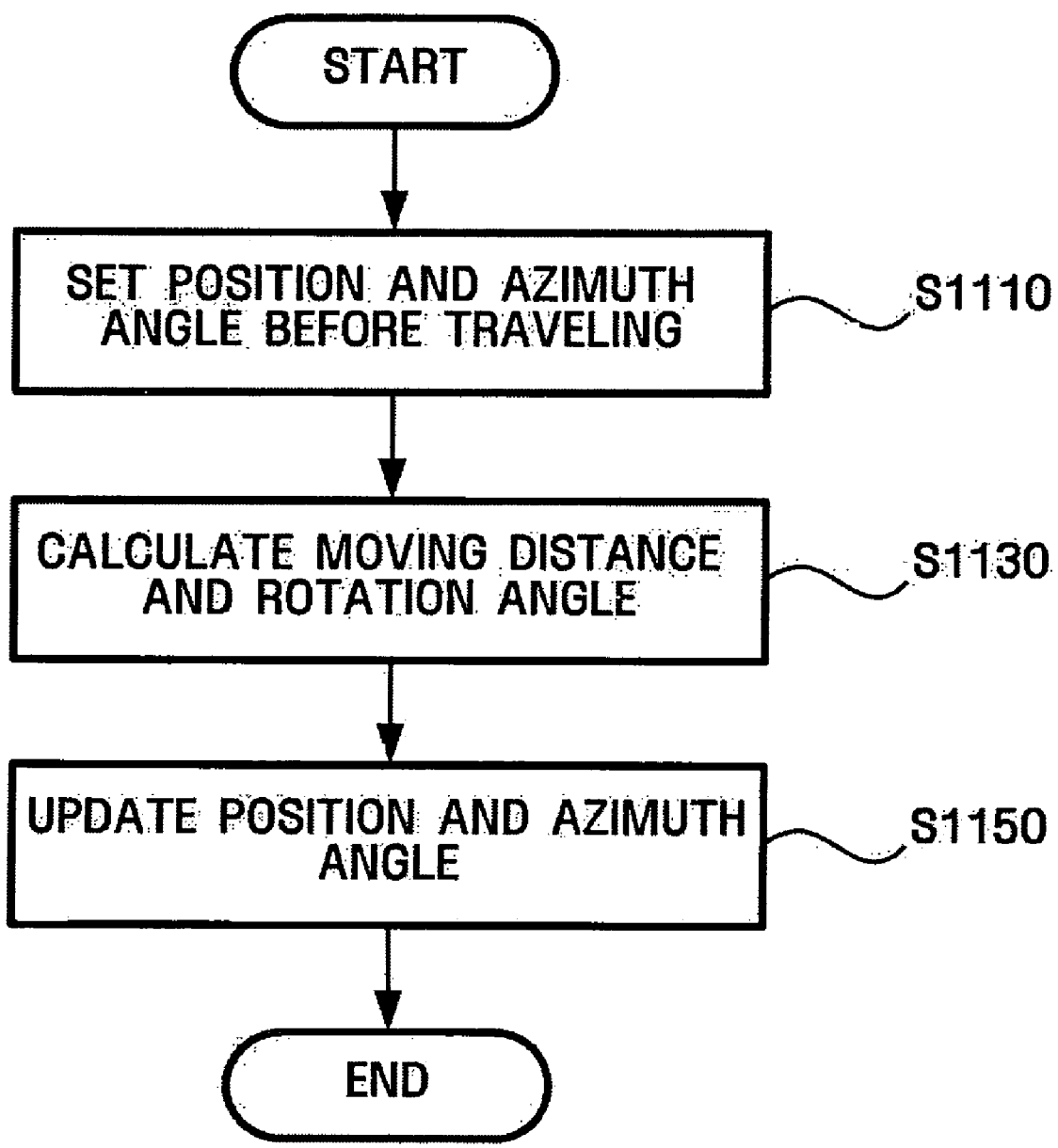
FIG. 11 is a flowchart of a method of a traveling unit processing traveling information according to an embodiment of the present invention.

FIG. 11 is a flowchart of a method of a traveling unit processing traveling information according to an embodiment of the present invention. Operations shown in FIG. 11 are performed by the traveling information processor 134 shown in FIG. 2.

The traveling information processor 134 sets a coordinate value (x,y) and an azimuth angle of a current position of the system 100 on an X-Y plane in operation S110. Thereafter, when the control unit 110 shown in FIG. 2 receives a traveling command from a user, the driver 132 operates and the traveling information processing unit 130 connected with a motor of the driver 132 calculates the amount of a rectilinear movement of the traveling unit 130 and the amount of a rotary movement of the traveling unit 130 in operation S1130. Results of the calculation are transmitted to the traveling state determiner 116. The traveling state determiner 116 compares information on a rectilinear moving distance or a rotation angle received from the image information processor 154 with the results of the calculation received from the traveling information processor 134 to detect a traveling state of the system 100. In this case, the traveling information processor 134 may include an encoder.

In operation S1150, the traveling information processor 134 updates the position and the azimuth of the system 100 based on the position and the azimuth angle set in operation S1110 and the amount of a rectilinear movement and the amount of a rotary movement calculated in operation S1130.

Hereinafter, a method of the traveling information processor 134 calculating the amount of a rectilinear movement and the amount of a rotary movement will be described.

A position of a robot (i.e., the system 100) before a traveling command is received from a user is set to (x,y,θ) where "x" and "y" denote coordinates on a plane having a random point as the origin and "θ" denotes an azimuth angle.

After the robot starts traveling, distances that wheels of the driver 132 shown in FIG. 2 rotate can be expressed by Equations (4) and (5). Equation (4) expresses a distance that a left wheel rotates while Equation (5) expresses a distance that a right wheel rotates.

$$\Delta U_{L,i} = C_m N_{L,i} \qquad (4)$$

$$\Delta U_{R,i} = C_m N_{R,i} \qquad (5)$$

Here, each of $N_{L,i}$ and $N_{R,i}$ denotes the number of pulses obtained from an encoder included in the traveling information processor 134 shown in FIG. 2, and each $\Delta U_{L,i}$ and $\Delta U_{R,i}$ denotes a distance that each of the left and right wheels rotates in proportion to each of $N_{L,i}$ or $N_{R,i}$. In addition, $C_m$ denotes is a constant used to convert the number of pulses obtained from the encoder into a distance that each wheel rotates and can be expressed by Equation (6).

$$C_m = \frac{\pi D_n}{n C_e} \qquad (6)$$

Here, $D_n$ denotes a diameter of each wheel, "n" denotes a gear ratio between a motor equipped with the encoder and the wheel, and $C_e$ denotes the number of pulses generated by the encoder during a single rotation of the wheel. Accordingly, an average distance that a center between the left and right wheels moves can be expressed by Equation (7), and a changed azimuth angle can be expressed by Equation (8).

$$\Delta U_i = (\Delta U_{L,i} + \Delta U_{R,i})/2 \qquad (7)$$

$$\Delta \theta_i = (\Delta U_{R,i} - \Delta U_{L,i})/b \qquad (8)$$

Here, Equation (8) corresponds to a case where the traveling unit 130 rotates to the left, and "b" denotes a distance between the left and right wheels. Accordingly, when a rotary movement is performed, an updated azimuth angle can be expressed by Equation (9).

$$\theta_i = \theta_{i-1} + \Delta \theta_i \qquad (9)$$

When a rectilinear movement is performed, updated coordinates "x" and "y" can be expressed by Equations (10) and (11).

$$x_i = x_{i-1} + \Delta U_i \cos \theta_i \qquad (10)$$

$$y_i = y_{i-1} + \Delta U_i \sin \theta_i \qquad (11)$$

Figure 12:
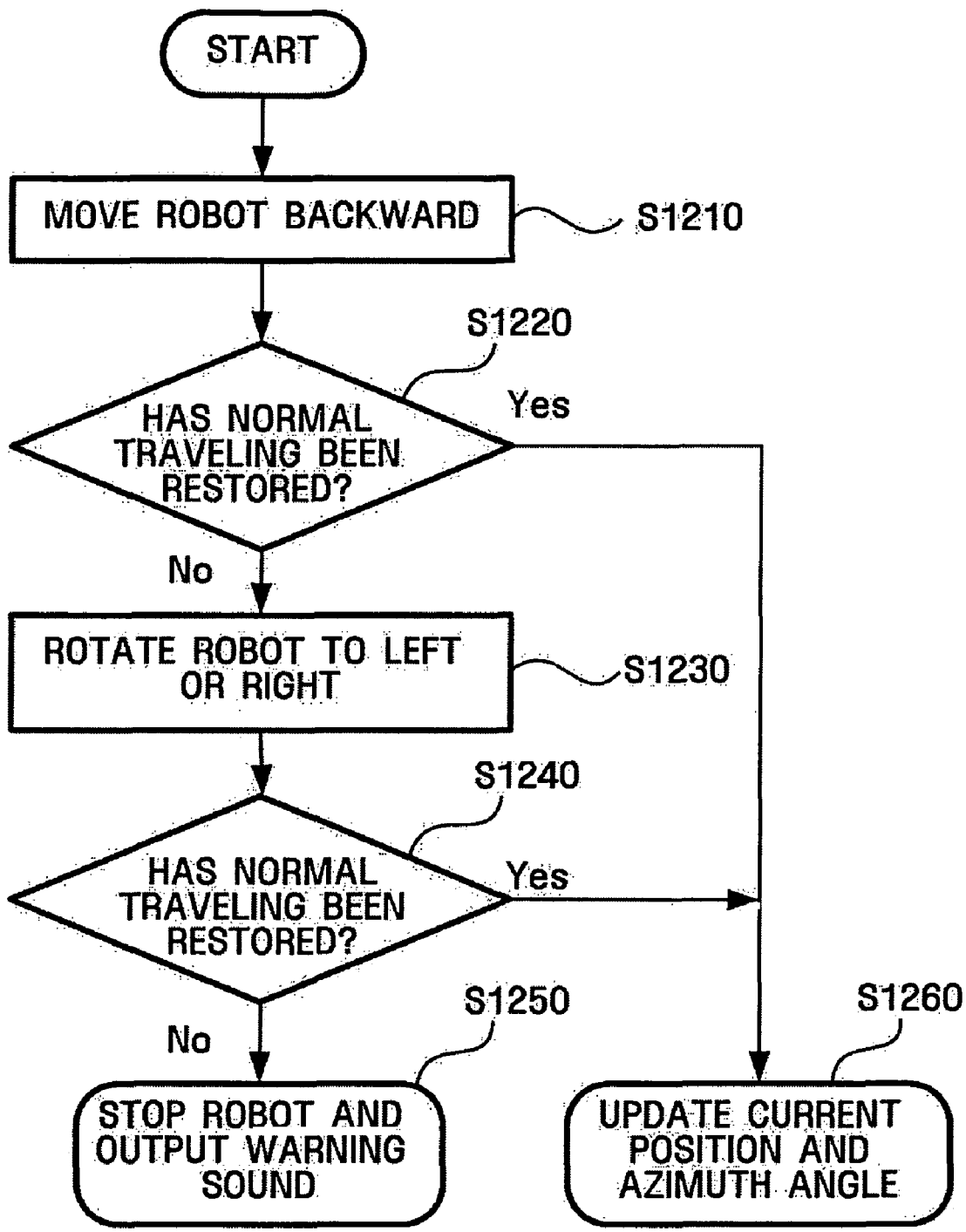
FIG. 12 is a flowchart of a method of compensating for an abnormal traveling state according to an embodiment of the present invention.

FIG. 12 is a flowchart of a method of compensating for an abnormal traveling state according to an embodiment of the present invention. In this embodiment, it is assumed that a robot has received a rectilinear movement command, and it has been determined that a wheel of the robot turns idle.

To compensate for the current abnormal traveling state and restore the robot to a normal traveling state, the compensator 114 included in the control unit 110 shown in FIG. 2 controls the driver 132 included in the traveling unit 130 to move backward in operation S1210. Thereafter, whether the robot has been restored to the normal traveling state is determined in operation S1220. When it is determined that the robot has been restored to the normal traveling state, a current position and azimuth angle of the robot are updated in operation S1260.

When it is determined that the robot has not been restored to the normal traveling state, the compensator 114 controls the driver 132 to rotate to the left or to the right in operation 1230. Thereafter, when it is determined that the robot has been restored to the normal traveling state in operation S1240, the current position and azimuth angle of the robot are updated in operation S1260.

When it is determined that the robot has not been restored to the normal traveling state even after the robot was rotated to the left or right, the compensator 114 stops the driver 132 and outputs a warning sound or the like to inform the user of the abnormal traveling state in operation S1250.

In another embodiment, when the robot has received a rotary movement command and slippage of a wheel has been detected, an azimuth angle of the robot is calculated using a rotation angle obtained by the image receiving unit 150 instead of a rotation angle obtained by the traveling unit 130.

According to the above-described embodiments of the present invention, an abnormal traveling state which may occur during a rectilinear movement or a rotary movement of a mobile robot is efficiently detected and is converted into a normal traveling state. As a result, the robot remains normal traveling.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A system for detecting a traveling state, comprising:
   an image receiving unit to acquire two consecutive images and to detect first traveling information from image information regarding each of the two consecutive images;
   a traveling information processing unit connected to a driver moving in a direction perpendicular to a direction in which the images are acquired, the traveling information processing unit to detect second traveling information from the driver; and
   a control unit to determine the traveling state based on the first traveling information and the second traveling information,
   wherein the first traveling information includes information indicating a rectilinear movement state using a difference in the image information between the two consecutive images,
   the second traveling information includes integrated distance information indicating a distance that the driver moves, and
   the control unit determines that the traveling state is abnormal when the first traveling information indicates that a rectilinear movement is not performed and the second traveling information exceeds a predetermined threshold value,
   wherein, when the traveling state is determined to be abnormal, the control unit is capable of moving the driver backward to achieve a normal traveling state.

2. The system of claim 1, wherein, when the traveling state is determined to be abnormal, the control unit rotates the driver to achieve a normal traveling state.

3. A system for detecting a traveling state, comprising:
   an image receiving unit to acquire two consecutive images and to detect first traveling information from image information regarding each of the two consecutive images;
   a traveling information processing unit connected to a driver moving in a direction perpendicular to a direction in which the images are acquired, the traveling information processing unit to detect second traveling information from the driver; and
   a control unit to determine the traveling state based on the first traveling information and the second traveling information,
   wherein the first traveling information includes information on an angle corresponding to a least value among values obtained by respectively converting the two consecutive images into two polar coordinate images having an angle and a distance corresponding to the angle as coordinate axes and by calculating differences in image information between the two polar coordinate images while moving one of the two polar coordinate images in a direction of a coordinate axis indicating the angle,
   the second traveling information includes information indicating a rotational displacement of the driver, and
   the control unit determines that the traveling state is abnormal when a difference between a value of the first traveling information and a value of the second traveling information exceeds a threshold value,
   wherein, when the traveling state is determined to be abnormal, the control unit is capable of moving the driver backward to achieve a normal traveling state.

4. The system of claim 3, wherein, when the traveling state is determined to be abnormal, the control unit set the first traveling information as a current rotation angle.

5. A non-transitory computer-readable storage medium encoded with processing instructions for causing a processor to perform a method of detecting a traveling state, the method comprising:
   acquiring two consecutive images and detecting first traveling information from image information regarding each of the two consecutive images;
   detecting second traveling information from a driver moving in a direction perpendicular to a direction in which the images are acquired; and
   determining the traveling state based on the first traveling information and the second traveling information using a control unit,
   wherein the first traveling information includes information indicating a rectilinear movement state using a difference in the image information between the two consecutive images,
   the second traveling information includes integrated distance information indicating a distance that the driver moves, and
   the control unit determines that the traveling state is abnormal when the first traveling information indicates that a rectilinear movement is not performed and the second traveling information exceeds a predetermined threshold value,
   wherein, when the traveling state is determined to be abnormal, the control unit is capable of moving the driver backward to achieve a normal traveling state.

6. A computer-readable storage medium encoded with processing instructions for causing a processor to perform a method of determining a rotary movement state, the method comprising:
   receiving a first image and a second image;
   converting the first image and the second image into respective first and second polar coordinates;
   acquiring a first polar image and a second polar image from the first polar coordinates and the second polar coordinates, respectively; and
   detecting a rotation angle by setting a parameter shift_count to adjust the number of sum of squared distance (SSD) calculations which are calculated with respect to 360 angles each at an interval of 1 degree from 0 degrees to 359 degrees.

7. A computer-readable storage medium encoded with processing instructions for causing a processor to perform a method of determining a rectilinear movement state, the method comprising:

receiving two consecutive images from an image grabber;

calculating a normalized difference between the two consecutive images by calculating a value indicating a normalized image using a difference between the two consecutive images; and determining whether the normalized difference exceeds a threshold value and, when the normalized difference exceeds a the threshold value, setting a parameter variable to "TRUE" indicating rectilinear movement, and when the normalized difference does not exceed the threshold value, setting the parameter variable to "FALSE" indicating no rectilinear movement.

8. A computer-readable storage medium encoded with processing instructions for causing a processor to perform a method of processing traveling information, the method comprising:

setting a coordinate value (x,y) and an azimuth angle ($\theta$) of a current position of a robot on an X-Y plane;

calculating an amount of a rectilinear movement of a traveling unit of the system and the amount of a rotary movement of the traveling unit; and updating the position and the azimuth of the system based on the set position and the set azimuth angle and the amount of calculated rectilinear movement and the amount of calculated rotary movement.

* * * * *

UNITED STATES PATENT AND TRADEMARK OFFICE
CERTIFICATE OF CORRECTION

| | | |
|---|---|---|
| PATENT NO. | : 8,014,900 B2 | Page 1 of 1 |
| APPLICATION NO. | : 11/126259 | |
| DATED | : September 6, 2011 | |
| INVENTOR(S) | : Hong et al. | |

It is certified that error appears in the above-identified patent and that said Letters Patent is hereby corrected as shown below:

Column 13, Line 56, In Claim 1, delete "is capable of moving" and insert --moves--, therefor.
Column 14, Line 23, In Claim 3, delete "is capable of moving" and insert --moves--, therefor.
Column 14, Line 54, In Claim 5, delete "is capable of moving" and insert --moves--, therefor.
Column 15, Line 15, In Claim 7, delete "a the" and insert --the--, therefor.

Signed and Sealed this
Seventh Day of February, 2012

David J. Kappos
*Director of the United States Patent and Trademark Office*